United States Patent [19]

Werntz

[11] 4,117,923
[45] Oct. 3, 1978

[54] DRIVE MEANS FOR ROLLER CONVEYORS

[75] Inventor: Charles W. Werntz, Ferguson, Mo.

[73] Assignee: Alvey Inc., St. Louis, Mo.

[21] Appl. No.: 801,535

[22] Filed: May 31, 1977

[51] Int. Cl.² ............................................. B65G 13/07
[52] U.S. Cl. .................................... 198/790; 198/835
[58] Field of Search ............... 198/780, 781, 787, 789, 198/790, 813, 817, 832, 835

[56] References Cited

U.S. PATENT DOCUMENTS

| 528,775 | 11/1894 | Hogue | 198/790 |
|---|---|---|---|
| 633,572 | 9/1899 | Cromwell | 198/790 |
| 1,425,988 | 8/1922 | Lansing | 198/817 |
| 1,598,099 | 8/1926 | Murray | 198/790 |
| 1,715,301 | 5/1929 | Mason et al. | 198/835 |
| 1,974,826 | 9/1934 | Low | 198/835 |
| 2,128,594 | 8/1938 | Rasmussen | 198/815 |
| 2,699,942 | 1/1955 | Rineer | 198/790 |
| 3,170,561 | 2/1965 | Schneider | 198/781 |
| 3,323,636 | 6/1967 | Gotham | 198/790 |
| 3,420,355 | 1/1969 | DeGood et al. | 198/781 |

FOREIGN PATENT DOCUMENTS 1,275,461  10/1961  France ........................ 198/815

Primary Examiner—Evon C. Blunk
Assistant Examiner—Richard K. Thomson
Attorney, Agent, or Firm—Gravely, Lieder & Woodruff

[57] ABSTRACT

Conveyor means of roller type in which the rollers may be set up to define a straight path or a curved path, and in which the objects are moved with a low pressure drive through the cooperation of a low friction type round belt or rope powered by a drum and sheave mechanism that effectively operates the low friction belt or rope, the drum being provided with a wear resistant and high friction surface that will withstand the abrasive action of the belt or rope and obtain a grip on the rope.

2 Claims, 4 Drawing Figures

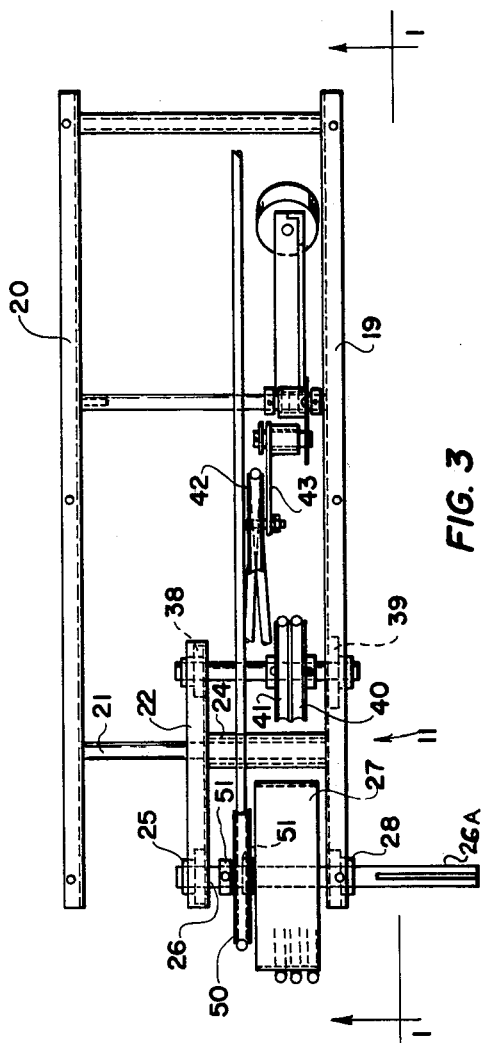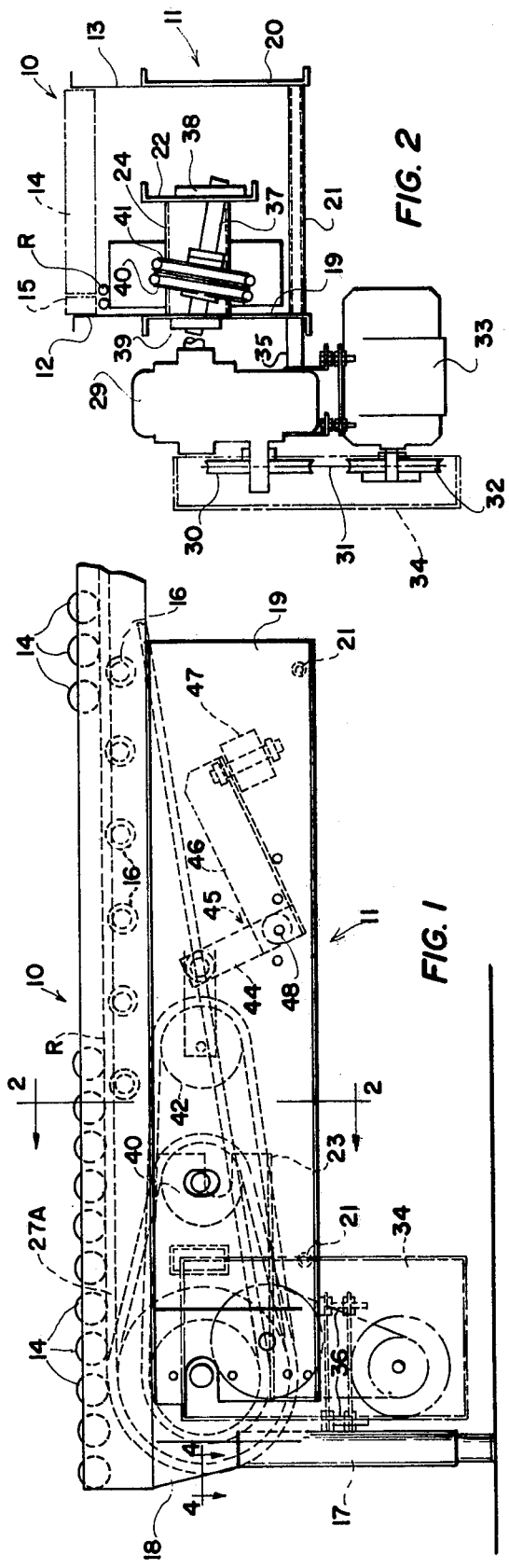

DRIVE MEANS FOR ROLLER CONVEYORS

BACKGROUND OF THE INVENTION

Article conveying roller conveyors having drives using flat or V-shaped belts, or having round belts or ropes for driving the rollers are well known. Conveyors of this arrangement are exemplified by Taylor U.S. Pat. No. 2,129,510 of Sept. 6, 1938, or Pevear U.S. Pat. No. 2,002,830 of May 28, 1935, or Eggleston U.S. Pat. No. 1,959,157 of May 15, 1934. More recently the roller conveyor of Gotham U.S. Pat. No. 3,323,636 of June 6, 1967 has disclosed a round belt drive in connection with straight line conveyors, while Fleischauer et al. U.S. Pat. No. 3,610,406 of Oct. 5, 1971 has utilized a V-shaped belt for a straight roller conveyor. These examples tend to show that V-shaped belts are generally better adapted to straight sections, while round belts or rope are capable of driving rollers supported in curved sections, as well as straight sections.

The problem with rope drives for conveyors has been that the rope is sensitive to changes in humidity and can become excessively tight or loose so that uniform drive conditions are difficult to maintain. The advantage of rope drives is that the length of the drive can be quite long, being of the order of several hundred feet. The V-shaped belt, on the other hand, has largely replaced the rope drive on the basis of its better contact and less sensitivity to humidity conditions. However, the splice in V-shaped belts has reduced the length that can be used, thereby requiring short lengths of conveyor sections and drive transition means to couple the short conveyor lengths to make up the full length desired. The short length limitation for V-shaped drive belts is dictated by the strength of the splice, and the tension the belt can stand.

In addition to the limitations inherent in rope and V-shaped belt drive means, there is the added problem connected with conveying articles packaged in shrink wrap film. This type of film has an inherent characteristic of being tacky which means that the film tends to stick to almost any material. Coupled with the shrink wrap film problem, there is the noise problem of the splices in the rope or V-shaped belt drive means hitting the rollers, and this noise is especially undesirable if the splices are large.

BRIEF SUMMARY OF THE INVENTION

The present invention is related to positive drive means for low pressure roller conveyors operated with the use of rope or round drive means contacting the rollers.

The advantages of rope or round belt drives for roller conveyors reside in the exceptionally long uninterrupted lengths of conveyor sections that can be driven, the drive developed in curved conveyor sections which is possible since rope or a round belt has no directional limitation, the ability to rely upon a central motor drive, and the applicability of the drive to use a low friction characteristic drive rope with a high friction rope drive so that article blockage on the conveyor rollers will permit the rope to slide relative to the rollers supporting the blocked articles and not unduly load the object on the conveyor or the drive means.

The broad embodiment of this invention comprises a conveyor frame supporting an assembly of rollers that may be set up in a straight path or a curved path or both straight and curved paths, a low friction drive rope of endless character running throughout the conveyor length, rope-support snubbing rollers to position the rope in low pressure driving engagement with the rollers, and a rope drive assembly in which the rope is wrapped about a drum having a high friction surface and means to maintain the rope in a desired tension condition.

More specifically the invention resides in a roller conveyor having side rails in spaced relation, a plurality of object supporting rollers carried by the side rails to form a conveyance path, an endless roller drive rope or belt engaged with the rollers by snubbing rollers, and a drive assembly for the rope or belt comprising a frame adjacent one end of the side rails, a drum rotatably mounted in the frame to present a high friction surface to receive the endless rope or belt in wrapped relation, rope or belt wrap control means spaced from the drum in position to receive the rope or belt from the drum and return it to the drum for subsequent wraps, a rope or belt tension adjustment sheave operably mounted in the frame to receive the rope or belt from the drum, and means positioned in the frame to receive the rope or belt from the tension adjustment sheave and return it to engage the object supporting rollers.

BRIEF DESCRIPTION OF THE DRAWINGS

The presently preferred embodiment of the invention is illustrated in the accompanying drawings, wherein:

FIG. 1 is a side elevation of the assembly at the end portions of an article conveyor showing the drive means therefor;

FIG. 2 is a transverse sectional view of the assembly seen along line 2—2 in FIG. 1;

FIG. 3 is a plan view of the drive means with the article conveyor removed; and

FIG. 4 is a fragmentary section view of the rope propelling drum in the drive means to show the surface construction thereof, the view being seen along line 4—4 in FIG. 1.

DETAIL DESCRIPTION OF THE EMBODIMENT

The several views of FIGS. 1, 2 and 3 show the assembly of one end of a low pressure article conveyor 10 and a drive means 11 for the conveyor. The article conveyor 10 includes spaced side rails 12 and 13 with the flanges turned outwardly to provide a clear space between the rail webs for the operative mounting of a plurality of rollers 14 which form across the upper surfaces the article conveying path. Each roller 14 may be a unitary member if desired, or it may be (as shown in FIG. 2) a roller of the character disclosed in U.S. Pat. No. 4,006,815 issued Feb. 8, 1977. In this embodiment there is provided a drive section 15 which is engaged by a drive rope R. The rope R is held upwardly by a plurality of snubbing rollers 16 operatively supported by the side rail 12. The conveyor side rails are supported by suitable legs 17 (one being shown in FIG. 1) connected by a suitable attachment member 18. The term "rope" is used herein to refer to a drive member or belt that is round in section.

The drive means for the roller propelling rope R is seen in the several views of the drawing to be assembled in a frame suspended from the lower flanges of the rails 12 and 13. The frame is composed of deep web channels 19 and 20 held in spaced relation by spacer means 21 along the lower margins. An intermediate channel 22 is positioned between channels 19 and 20 by a box member 24. The channel 22 affords support for a bearing 25 which carries one end of the driven shaft 26 for the rope propelling drum 27. The shaft 26 passes through a bearing 28 carried by the channel 19, and the extended end portion 26A of the shaft enters housing 29 (FIG. 2) for connection to a reduction gear drive of desired type. The gear drive in housing 29 is powered by a pulley 30 connected by belt 31 to the pulley 32 on the shaft of motor 33. The pulleys 30 and 32 and the belt 31 are protected by a removable guard 34. As seen in FIG. 2, the housing 29 is spaced from the channel 19 by means 35, and the motor 33 is adjustably attached by threaded means 36 to the housing 29.

The channel 19 and the intermediate channel 22 carry a shaft 37 in bearings 38 and 39. The bearings 38 and 39 are vertically out of alignment so that the shaft 37 is held at an angle to the horizontal. The shaft 37 carries free wheeling sheaves 40 and 41 which are adjacent each other, but free to rotate independently and differentially if necessary. The sheaves 40 and 41 are aligned with the drum 27 to cooperate in aligning the several turns or wrap of the rope R about the drum. In the embodiment shown in FIG. 1 the rope R wraps over the top of drum 27 and is seen at 27a, that wrap leaves the bottom of the drum 27 and runs out under sheave 40 which is slanted so that the rope leaving the top of the sheave has been moved to the right and runs over the drum at wrap 27b. The rope next runs out under sheave 41 and due to the slant of the sheave is moved to the right as it passes over the drum 27 at wrap 27c. Thus the rope is prevented from running over itself or binding on the drum.

The drive assembly includes a rope tension adjustment sheave 42 which is carried at the end of a link 43. The link 43 is pivotally connected to one arm 44 of a bellcrank 45, and the opposite arm 46 supports a counterweight 47 which may be any convenient size to maintain a desired load on the sheave 42. The bellcrank 45 is pivoted on a shaft 48 between restraining stops 49 which may be adjusted along the shaft to properly align the sheave 42 with the rope pass 27c as it leaves the under side of drum 27 and with a free wheeling take-off sheave 50 which is carried on the shaft 26 at one side of the drum 27. The sheave 50 is adjustable along the shaft 26 by movable stops 51.

FIG. 4 shows an important feature of the drive assembly which is concerned with the surface treatment of the drum 27. The drum has a plain cylindrical surface over which is secured a cover made up of a base ply of a polyester fabric F impregnated with urethane and an overlay ply P of urethane. The cover is properly cured to reduce the two plies to a unitary state. For purpose of this disclosure the plies F and P have been shown. The cover provides a high friction surface to establish a substantially non-slip grip on the rope R which is a polyester type of low friction rope of the character disclosed in U.S. Pat. No. 3,078,755 issued Feb. 26, 1963 to A. F. Chace, Jr. and made by Sampson Cordage Works under the name STABLE BRAID.

In FIG. 1 it can be seen that the rope R is held against the under side of the rollers sections 15 by snubbing rollers 16, and the rope moves from right to left so that the drum 27, rotating counter clockwise, is first contacted tangentially over its top. Thus, the roller propelling rope R makes a first wrap 27a (FIG. 3) on the drum closest to the channel 19. The first wrap passes off the drum and engages the idler sheave 40 before returning to make a second wrap 27b on the drum 27. The second wrap returns to the second idler sheave 41 and then passes back to the drum at wrap 27c. The wrap of the rope R on the drum 27 is kept in spiral alignment by angling the shaft 37 which supports the idler sheaves 40 and 41. The rope which leaves the sheave 41 returns to make the last wrap 27c on drum 27 before running out to the rope tension adjustment sheave 42. From the adjustment sheave 42 the rope R passes around the free wheeling sheave 50 and takes off in an angular direction toward the roller conveyor 10 on its return pass to the remote end of the conveyor (not shown).

What is claimed is:

1. In an article conveying live roller conveyor having a frame with spaced rails defining a conveying path, a plurality of article supporting rollers operatively carried by said rails, snubbing roller means carried by said rails adjacent said article supporting rollers, an endless rope drive member supported by said snubbing roller means in position to engage and rotate said article supporting rollers, and power operated drive means for pulling said rope drive in a direction for rotating said article supporting rollers to transport articles supported thereon, said drive means returning said rope drive to the conveying path, the improvement of the drive means comprising a pair of shafts supported by said frame in positions with one shaft having its axis horizontally directed and the other shaft having its axis at an angle to the horizontal, said pair of shafts being otherwise in parallel spaced relation, a drum connected to said one shaft and having a cylindrical surface, at least two sheaves carried by said other shaft and free to rotate independently thereon, a further sheave independently rotatable on said one shaft adjacent said drum, a tension adjusting sheave movably carried by said frame, a counterweight connected to said tension adjusting sheave to exert a force thereon to move the same, said endless rope drive member being trained about said drum surface and said independently rotatable sheaves such that said rope drive member tracks on said drum surface in a plurality of adjacent wraps, said rope drive member finally leaving said drum surface engaging with said movable sheave for tension adjustment by said counterweight and engaging said further sheave before returning to rotate said article supporting rollers, said further sheave being engaged by said rope drive member for directing it in its returning direction to rotate said article supporting rollers.

2. The article conveying live roller conveyor of claim 1 wherein said endless rope drive member has a braided round body formed of synthetic fibers having a low friction characteristic, and said cylindrical drum has a composite covering having a high friction characteristic.

* * * * *